United States Patent
Daab et al.

(10) Patent No.: US 8,128,156 B2
(45) Date of Patent: Mar. 6, 2012

(54) MOTOR VEHICLE WITH FORWARD-ARCHED BULKHEAD

(75) Inventors: Christoph Daab, Darmstadt (DE); Karl-Heinz Arndt, Wahlheim (DE); Norbert Ranker, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/671,181

(22) PCT Filed: Jun. 25, 2008

(86) PCT No.: PCT/EP2008/005169
§ 371 (c)(1), (2), (4) Date: Jan. 28, 2010

(87) PCT Pub. No.: WO2009/015738
PCT Pub. Date: Feb. 5, 2009

(65) Prior Publication Data
US 2010/0201157 A1    Aug. 12, 2010

(30) Foreign Application Priority Data
Jul. 28, 2007   (DE) .......................... 10 2007 035 489

(51) Int. Cl.
*B62D 25/08*   (2006.01)
(52) U.S. Cl. ........................................ 296/192; 296/208
(58) Field of Classification Search .................. 296/192, 296/208
See application file for complete search history.

(56) References Cited

U.S. PATENT DOCUMENTS

| | | | |
|---|---|---|---|
| 4,717,198 A | 1/1988 | Komatsu | |
| 4,750,780 A | 6/1988 | Harasaki et al. | |
| 4,943,102 A | 7/1990 | Hamamoto et al. | |
| 4,988,144 A | 1/1991 | Johnson et al. | |
| 6,869,134 B2 | 3/2005 | Kato et al. | |
| 7,004,534 B2 | 2/2006 | Yoshii et al. | |
| 2005/0067859 A1 | 3/2005 | Yoshii et al. | |
| 2007/0102222 A1 | 5/2007 | Tanaka | |

FOREIGN PATENT DOCUMENTS

| | | |
|---|---|---|
| CN | 1962301 A | 5/2007 |
| DE | 3613775 A1 | 10/1986 |
| EP | 1346903 A2 | 9/2003 |
| EP | 1518780 A1 | 3/2005 |

OTHER PUBLICATIONS

German Patent Office, German Search Report for German Application No. 102007035489.6, dated May 6, 2008.
International Searching Authority, International Search Report for PCT Application No. PCT/EP20081005169, dated Sep. 11, 2008.
China Patent Office, Chinese Office Action, for Application No. 200880100509.6, dated Sep. 6, 2011.

*Primary Examiner* — Joseph Pape
(74) *Attorney, Agent, or Firm* — Ingrassia Fisher & Lorenz, P.C.

(57) ABSTRACT

A motor vehicle includes, but is not limited to a bulkhead for separating a vehicle interior space from an engine bay. The entire bulkhead in its upper area at a first bending point bends toward the front side of the vehicle (=forward), to then extend upwardly from there in a forward-arched area, where it forms a window support for a windshield. The bulkhead has an air inlet opening in a forwardly arched area that is connected with the vehicle interior space to supply air to the latter.

12 Claims, 4 Drawing Sheets

MOTOR VEHICLE WITH FORWARD-ARCHED BULKHEAD

CROSS-REFERENCE TO RELATED APPLICATIONS

This application is a U.S. National-Stage entry under 35 U.S.C. §371 based on International Application No. PCT/EP2008/005169, filed Jun. 25, 2008, which was published under PCT Article 21(2) and which claims priority to German Application No. 102007035489.6, filed Jul. 28, 2007, which are all hereby incorporated in their entirety by reference.

TECHNICAL FIELD

The invention relates to a motor vehicle with a bulkhead that is forwardly drawn or arched in its upper region.

BACKGROUND

In order to be in demand by consumers, attractive motor vehicles must, in addition to being high-tech, must be imbued with a stylish design, which separates the vehicle from the crowd. One aspect in designing a new vehicle involves a departure from known proportions, for example in such a way that the windshield is shifted more toward the front in comparison to known vehicle models.

During the technical implementation of this envisaged design, it must be borne in mind that, after incorporating a windshield shifted even more toward the front during the manufacturing process, the engine area near the bulkhead comes to abut the components to be installed there, for example the coolant expansion tank, under the anterior region of the windshield, making it harder, if not impossible, to access.

To illustrate the mentioned problems, FIG. 1 shows a vertical section through a passenger car, the middle of which was made parallel to the longitudinal direction of the motor vehicle. In this vehicle of prior art, the bulkhead has a bulkhead section 1 extending perpendicularly upward, branching away at a bending point 2. A first section, referred to as the upper front bulkhead 3, extends forwardly toward the front side of the motor vehicle or bends in the negative x, that is, the (−x) direction. A second section, referred to as upper rear bulkhead 4, runs largely perpendicularly upward. The upper rear bulkhead 4 is then welded with a reinforcement section 5, which ends up forming a window support 6 for the windshield 7. A service panel 8 most often comprised of plastic rests on the upper front bulkhead 3.

If the windshield 7 in this known passenger car is drawn toward the front (i.e., in the (−x) direction), the area of the engine bay near the bulkhead can no longer be accessed directly from above. This holds true in particular with respect to the mentioned bending point 2, meaning the bending point at the upper bulkhead (formed by the upper front bulkhead 3 and upper rear bulkhead 4)/lower bulkhead 1, where a bond or seal is to be established to prevent any rust from forming there. In a windshield drawn more toward the front, the sealing material can no longer be applied largely in a perpendicular manner from above, but at best at an inclination from below. However, the quality of the seal may suffer due to a hampered accessibility.

If necessary, the cited problem could be resolved by changing the sequence of assembly operations at the factory, i.e., by first fitting or machining the engine bay area near the bulkhead, and finishing by mounting the windshield. However, this measure significantly influences the entire operational sequence, resulting in considerable technical modifications and high costs.

One object of an embodiment of the invention is to provide a motor vehicle that has a windshield that is drawn further forward by comparison to a conventional design, and still has a readily accessible bending point between the upper bulkhead/lower bulkhead even after the windshield has been assembled during the motor vehicle manufacturing process, so that this bending point can be reliably sealed off. In addition, other objects, desirable features, and characteristics will become apparent from the subsequent summary and detailed description, and the appended claims, taken in conjunction with the accompanying drawings and this background.

SUMMARY

A first embodiment proposes a motor vehicle that has a bulkhead for separating a motor vehicle interior space from an engine bay. In its upper area, the bulkhead bends entirely at its first bending point toward the front side of the motor vehicle, i.e., toward the front. The bulkhead subsequently extends from the first bending point upwardly in a forwardly arched area, so as to there form a window support for a windshield at the height of the lower windshield edge. In the forwardly arched area, the bulkhead has an air inlet opening connected with the vehicle interior space to supply air to the latter.

In this embodiment, the bulkhead bends at the first bending point, generally a bending line, completely toward the very front of the vehicle area. What this means is that, starting at the first bending point, there is to remain no largely perpendicular, upwardly running portion of the bulkhead, as is the case with the conventional bulkhead designed as the upper rear bulkhead and described in the introductory part of the specification.

Starting at the first bending point, the bulkhead extends upwardly in a forwardly arched area. Within the framework of this description, the term "curve" is not to be construed as meaning that the enveloping contour of the bulkhead must exhibit a continuous curvature or some other smooth progression. In this sense, the term "curve" must be interpreted loosely, and also encompasses progressions with bends or jumps in the bulkhead. A "curve" must be understood in such a way that the bulkhead increasingly extends more steeply upward, to finally end at roughly the height of the lower edge of the windshield. The exact progression of the enveloping contour hinges on several factors, and depends on the respective vehicle model. One crucial factor is the installation space of the components to be mounted, and the hence still remaining free space in the engine bay. Another factor involves the geometry of the bulkhead, which must be stiff enough to also withstand a frontal collision of the vehicle.

In the forwardly arched area of the bulkhead, the latter exhibits at least one air inlet opening. The air inlet opening is used to supply fresh air into the vehicle interior. The air coming in through the air inlet opening streams toward the primary ventilator of the vehicle during operation, from where it is supplied to the vehicle interior. The primary ventilator can be part of a primary air conditioning module of a passenger car air conditioning system.

During motor vehicle manufacture, a vehicle with the bulkhead described above makes it possible to reliably bond or seal the first bending point 2, meaning a first interface surface between lower bulkhead 1 and the upper bulkhead portion, given an already mounted windshield drawn more toward the front, since this bending point is easily accessible from the motor vehicle interior.

In a second embodiment, the bulkhead abuts the first bending point as an essentially horizontal section, and the bulkhead above the horizontal section exhibits an upwardly bending, flat section.

A horizontal section is here not to be construed as meaning that said section must be horizontal over the entire vehicle width of the vehicle at one height, which could not be regularly realized in view of the components to be arranged in the engine bay. Rather, this is also meant to encompass a case in which the horizontal section has a plurality of horizontal (individual) sections that in their entirety comprise a roughly horizontal section.

If a vertical section to be provided in the middle of the vehicle in the longitudinal direction of the vehicle were to be fabricated from the motor vehicle, meaning a section as depicted on FIG. 1, the bulkhead in the area defined by the aforementioned embodiment would have the shape of a seat bench with a seating surface (the horizontal area) and a backrest (the flat area). This choice of shape ensures a high stiffness of the bulkhead given an increasingly steeper arrangement of sheet sections.

In a third embodiment, the spring strut domes are connected with the flat, bending section of the embodiment in the last paragraph.

As a result of the mentioned connection, generally a welded joint, the respective spring strut dome comes to lie under the inclination of the seatback-shaped flat section described above. This yields a better bond between the bulkhead and remaining body, thereby stiffening it. In addition, it improves the ability of the spring strut domes to absorb vertical forces during road collisions.

In another embodiment, the bulkhead above the bending, flat section has a section that runs perpendicularly upward and exhibits the air inlet opening.

The fresh air inlet opening is used to supply fresh air to the vehicle interior. As will be explained in even greater detail below, the side of the bulkhead facing the engine bay is provided with an outer radiator tank, through which air streams during operation. This outer radiator tank has an air outlet that coincides with said fresh air opening of the bulkhead. The perpendicularly running portion of the bulkhead facilitates a space-saving assembly of the oblong, horizontally aligned outer radiator tank, which ensures a good water separation.

In another embodiment, the bulkhead above the perpendicularly upwardly running section bends forwardly at a second bending point, thereby forming the window support after a horizontal section.

The horizontal section enables a sufficiently large cross section for the air inlet opening, and hence a sufficiently high volumetric flow of inflowing fresh air. In addition, the second bending point and the horizontal section allow access for mounting and servicing the components on the engine or in front of the bulkhead.

In another embodiment, the side of the bulkhead facing the engine bay is provided with a radiator tank equipped with an air inlet and air outlet, the air outlet of which is connected with the air inlet of the inner radiator tank in order to supply air to the latter.

As indicated above, the outer radiator tank is used to supply fresh air to the vehicle interior space via the primary ventilator, e.g., the primary air conditioning module. However, it is also used for water separation. An oblong, horizontally running, two-part radiator tank from the air inlet opening of the bulkhead to underneath the gap between the engine hood and windshield provides a long separation distance that enables reliable water separation.

In another embodiment, the side of the bulkhead facing the vehicle interior space is provided above its horizontal section with an inner radiator tank that has an air inlet that coincides with the air inlet opening of the bulkhead on the one hand, and an air outlet that is connected with the air inlet opening of the primary air conditioning module on the other.

The cited radiator tank is an inner radiator tank, i.e., it belongs to the vehicle interior space given its placement. It serves as a kind of precaution for cases in which water separation by the outer radiator tank ends up being inadequate, so that a direct supply of air from the air inlet opening of the bulkhead to the primary air conditioning module cannot be tolerated for safety reasons. Of course, the inner radiator tank can be replaced by a simple hose if the water separation by the outer radiator tank is sufficient.

Also provided is an embodiment in which the distance as measured from the middle of the vehicle and in the longitudinal direction of the vehicle between the air inlet opening and the first bending point measures at least 40%, preferably at least 50%, of the distance between the first bending point and the most anterior point of the windshield.

In this configuration, the outer radiator tank does not extend as far from the air inlet opening in the horizontal direction. As a result, a lower torque acts on the outer radiator tank, simplifying the rattle-proof attachment of the latter.

Other features and advantages of the claimed invention may be gleaned from the following detailed description with reference to the attached drawings, which are indicated below as examples that are not limiting. The use of reference numbers in the figures is here not to be construed as meaning that the reference numbers limit the protective scope of the claimed invention.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
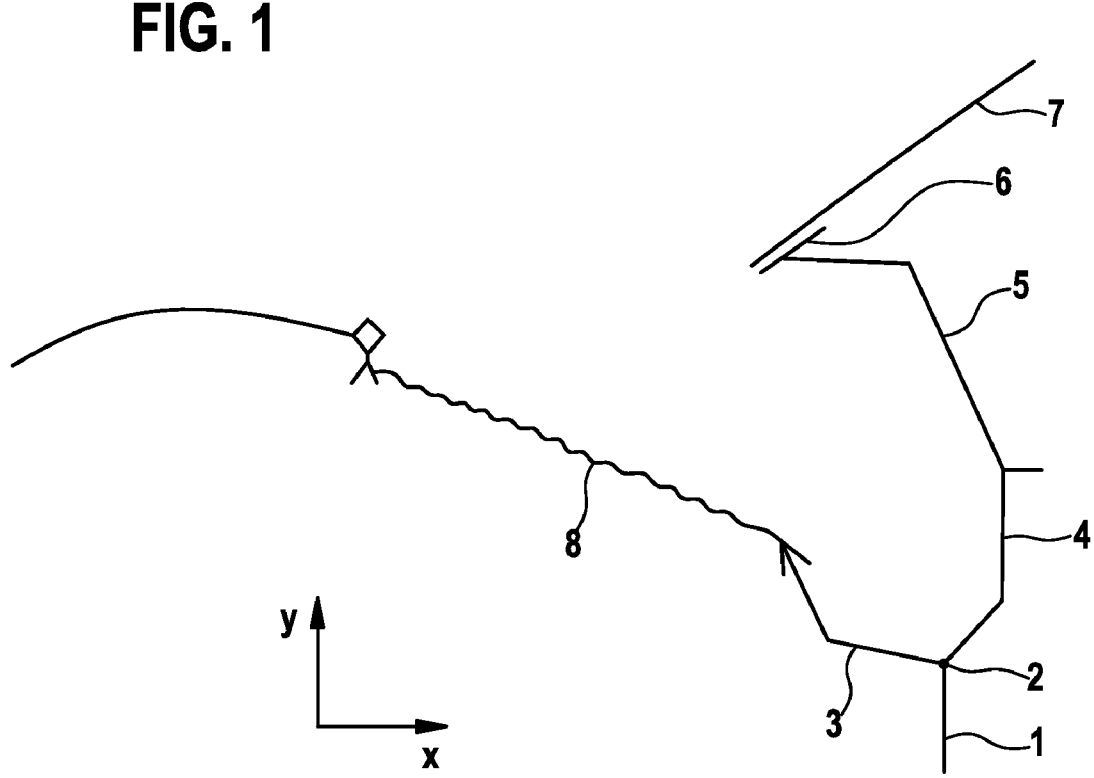
FIG. 1 is a vertical section in the middle of the vehicle along the longitudinal direction of the vehicle in a vehicle of prior art.
Figure 2:
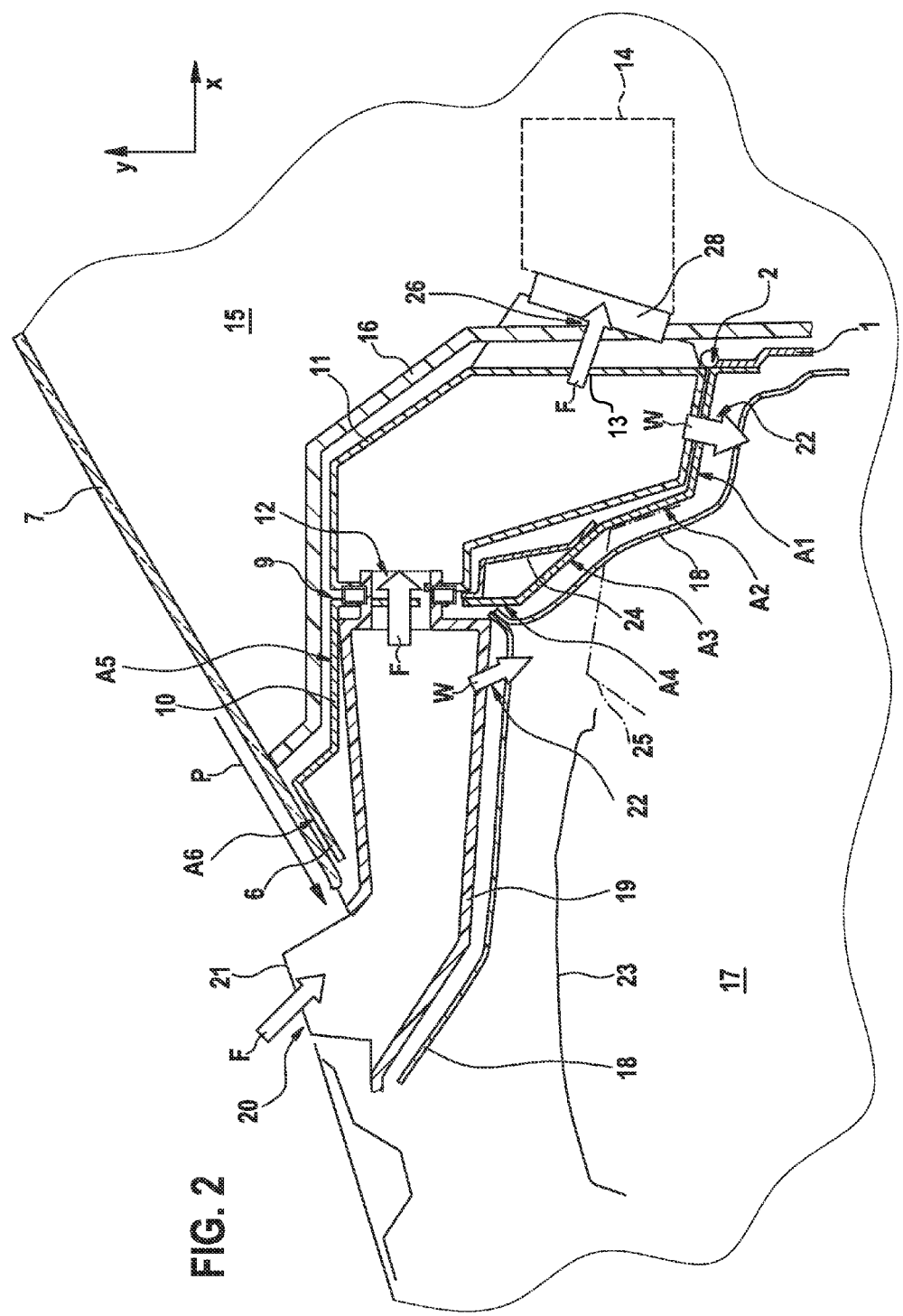
FIG. 2 is a vertical section in the middle of the vehicle along the longitudinal direction of the vehicle in a vehicle according to the invention.

In the figures, which generally denote identical objects with identical reference numbers, FIG. 2 shows a section through a passenger car with a bulkhead that bends toward the front side of the vehicle or in the (−x) direction after a lower bulkhead 1 section extending vertically upward at a first bending point 2, the bending lower bulkhead/upper bulkhead bending point. As usual, the positive x-direction defines the longitudinal direction of the vehicle toward the rear part of the vehicle, and the y-direction points toward the right side of the vehicle in the transverse direction of the vehicle.

At or above the first bending point 2, the upper bulkhead initially exhibits an essentially horizontal section A1, which subsequently passes over into a flat section A2 that is steeper than section A1. In this sectional view, sections A1 and A2 are shaped roughly like a seat bench with a seating surface A1 and a backrest A2. The section A3 that adjoins over section A2 lengthens the backrest of the seat bench-shaped profile A1, A2, as it were, and exhibits a lower inclination relative to section A2, and above that establishes the x-position of the perpendicularly upwardly running section A4 adjoining over the latter.

The four cited sections A1, A2, A3 and A4 of the upper bulkhead form a bulkhead that projects or curves forward starting at the bending point 2. Therefore, there is no upper rear bulkhead here of the kind encountered in prior art. As evident, the upper bulkhead formed by sections A1 to A4 has bending points in this embodiment that result from the geometries of the components located in the engine bay 17. The layout of sections A1, A2, A3 and A4 as essentially flat sheets facilitates production, and ensures that the upper bulkhead is sufficiently stiff.

The upper end point of the section A4 of the upper bulkhead extending perpendicularly upward is the second bending point 9, which passes over into a horizontal section 10 after section A4, so as to then form the window support 6 for the windshield 7.

An inner radiator tank 11 is screwed to the upper bulkhead inside the vehicle, specifically with its sections A1 and A3. It has an air inlet that coincides with the air inlet opening 12 of the upper bulkhead. Its air outlet is connected with the air inlet opening 26 of the primary air conditioning module 14 that is sealed by a gasket 28. Among other things, the inner radiator tank 11 is used for separating water from the fresh air F streaming in from outside, for example in the event of rainy weather, so that no damage is done to electrical components in the primary air conditioning module 14. The inner radiator tank 11 is tailored to the contour of the bulkhead sections A1, A2, and provided with insulation 16 toward the vehicle interior space 15. The upper bulkhead is provided with insulation 18 further toward the engine bay 17 to attenuate engine noise.

Further visible outside the vehicle is an outer radiator tank 19, which is horizontally arranged given an essentially oblong layout. The outer radiator tank 19 has an air inlet 20, to which fresh air F can flow through an opening (not shown) in the radiator tank cover 21, and an air outlet, which coincides with the air inlet opening 12 of the upper bulkhead.

Under rainy conditions, water flows down the windshield 7 in the direction of arrow P, but a portion of it also gets into the outer radiator tank 19. The long distance traversed by the water from the air inlet 20 to the air inlet opening 12 ensures good water separation, wherein separated water W can run off through a water drain 22.

The depicted geometric selection of the bulkhead presumes that there is enough space between the radiator tank cover 21 and the upper edge of the engine 23 to accommodate an outer radiator tank 19 between them. Vehicles that ensure this include vans, minivans, SUV's, all-terrain vehicles or station wagons.

As evident from FIG. 2, the first bending point 2, taking into account the extension in the transverse direction of the vehicle of de facto one bending line, is easily accessible from the vehicle interior space 15 during passenger car production, and can be readily sealed from there. At the same time, there is a long air path from the air inlet 20 via the air inlet opening 12 up to the air inlet opening 13, which can be utilized to achieve good water separation. The structure of the bulkhead additionally exhibits high stiffness, which can be improved as needed with reinforcement plates, e.g., a reinforcement plate 24 for strengthening the transitional area between the bulkhead sections A3 and A4.

The enveloping contour of the upper bulkhead can be selected in such a way that its section A3 directly contacts the spring strut dome 25, and is welded to the latter. Since the section of FIG. 2 is introduced in the middle of the vehicle, the spring strut dome 25 is not visible in this sectional view, but has still been sketched in with dashed lines so as to illustrate this aspect. Welding the spring strut dome 25 with section A3 improves the vertical absorption of force given uneven roads.

Figure 3:
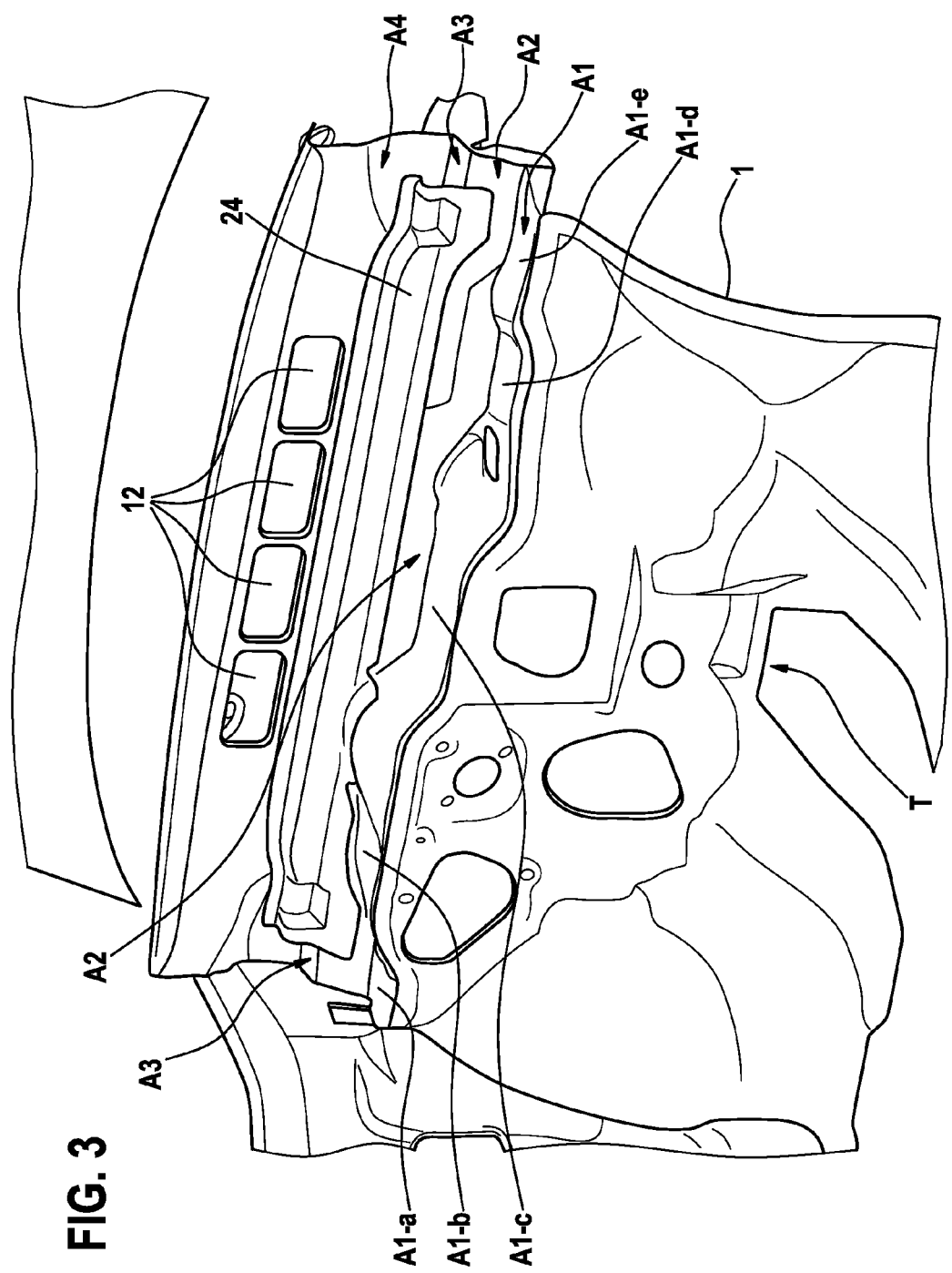
FIG. 3 is a first perspective view of the bulkhead viewed from the vehicle interior space.

FIG. 3 shows the bulkhead area of the motor vehicle on FIG. 2 as viewed from the perspective of the vehicle interior space 15. The lower bulkhead 1, which is largely upwardly perpendicular in its portion T in the middle of the vehicle, has a first section A1 consisting of a plurality of horizontal sections A1-$a$, A1-$b$, A1-$c$ ... A1-$e$, which are interrupted by non-planar sections, but exhibit an essentially horizontal progression in their entirety. Correspondingly hereto, section A2 also consists of several flat sections.

Figure 4:
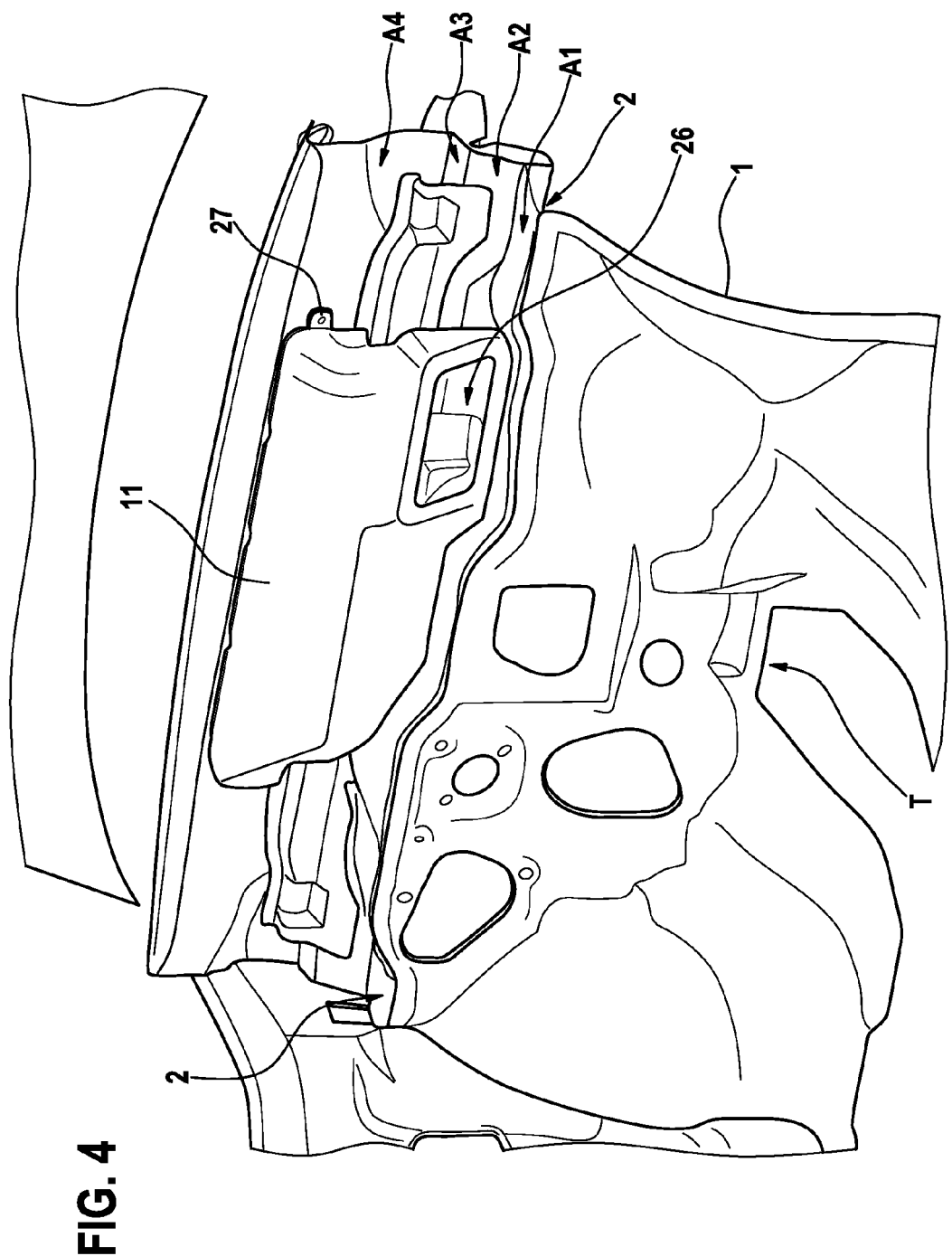
FIG. 4 is a second perspective view of the bulkhead viewed from the vehicle interior space.

FIG. 4 depicts a view corresponding to FIG. 3, except that the inner radiator tank 11 consisting of plastic is now screwed to the bulkhead 1 with the attachment bracket 27.

Even though specific embodiments were described above, the expert will recognize that the description of these embodiments is not intended to limit the invention in the form indicated. Rather, the invention is to encompass all modifications, equivalents and alternatives that fall within the protective scope of the claimed invention. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

The invention claimed is:

1. A motor vehicle, comprising:
   an interior passenger compartment including a passenger floor board;
   an engine bay; and
   a bulkhead partition spanning the width of said vehicle and configured to define said engine bay in front of said bulkhead and said passenger compartment behind said bulkhead, said bulkhead partition being constructed of high stiffness and rigidity to protect said passenger compartment during a frontal collision;
   said bulkhead partition comprising, in a vertical-plane cross-sectional view taken along the longitudinal axis of said vehicle, a lower bulkhead section extending perpendicularly upward from said floor board, and an upper bulkhead section extending upwardly and forwardly from said lower bulkhead section said upper and lower bulkhead sections being joined together at a first bulkhead interface surface;
   wherein the entirety of said upper bulkhead section extends upwardly and forwardly from said first bulkhead interface surface towards the front of the motor vehicle such that no portion of said upper bulkhead section extends rearwardly of said first bulkhead interface surface, said upper bulkhead extending upwardly in a forward-arched manner to form a window support for a windshield;

wherein said upper bulkhead section further comprises a fresh air opening configured to direct fresh air into said interior passenger compartment.

2. The motor vehicle according to claim 1, wherein said bulkhead partition comprises an essentially horizontal section extending forwardly from said first bulkhead interface surface, and above said horizontal section said bulkhead partition comprises a flat section extending upwardly away from said horizontal section.

3. The motor vehicle according to claim 2, wherein a spring strut dome is connected with said flat section.

4. The motor vehicle according to claim 3, wherein said bulkhead partition above said flat section comprises a section that runs substantially perpendicularly upward and which includes said fresh air opening.

5. The motor vehicle according to claim 4, wherein the bulkhead partition extends forwardly above said section running perpendicularly upward at a second interface so as to form the window support.

6. The motor vehicle according to claim 1, further comprising an outer radiator tank equipped with a first air inlet and a first air outlet on a side of the bulkhead facing the engine bay, wherein said first air outlet is connected with said fresh air opening.

7. The motor vehicle according to claim 1, further comprising a primary air conditioning module and an inner radiator tank situated on a side of the bulkhead facing the vehicle interior space, said inner radiator tank comprising:

a second an air inlet that coincides with said fresh air opening of said bulkhead partition; and a second air outlet connected with said primary air conditioning module.

8. The motor vehicle according to claim 1, wherein a distance measured in a center of the motor vehicle and in a longitudinal direction of the motor vehicle between said fresh air opening and said first bulkhead interface surface measures at least 40% of a distance between the first bulkhead interface surface and an anterior point of the windshield.

9. The motor vehicle according to claim 1, wherein the motor vehicle is a van.

10. The motor vehicle according to claim 9, wherein the motor vehicle is a minivan.

11. The motor vehicle according to claim 1, wherein the motor vehicle is station wagon.

12. The motor vehicle according to claim 1, wherein the motor vehicle is an SUV.

* * * * *